Sept. 30, 1958     W. O. BAKER     2,854,142
FILTER

Filed July 18, 1956     3 Sheets-Sheet 1

WILLIAM O. BAKER
INVENTOR.

BY *Lyon & Lyon*
ATTORNEYS.

Sept. 30, 1958     W. O. BAKER     2,854,142
FILTER
Filed July 18, 1956     3 Sheets-Sheet 3
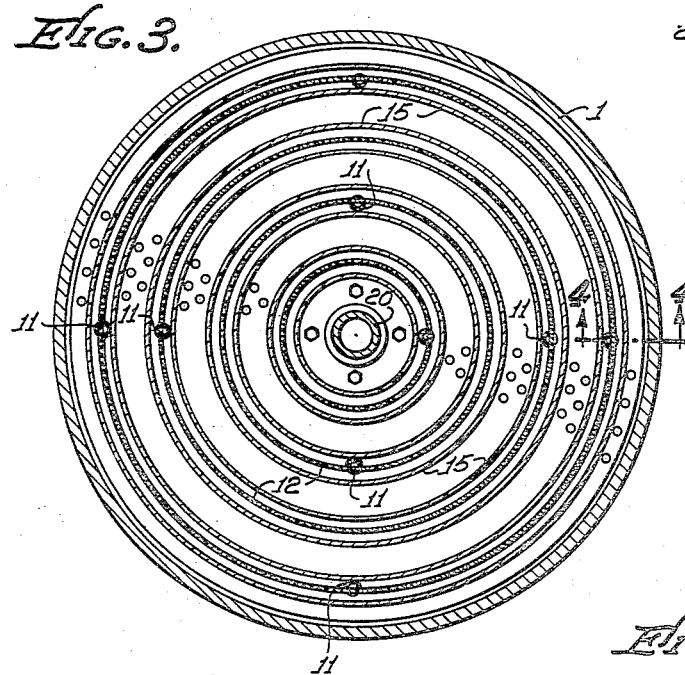
Fig. 3.
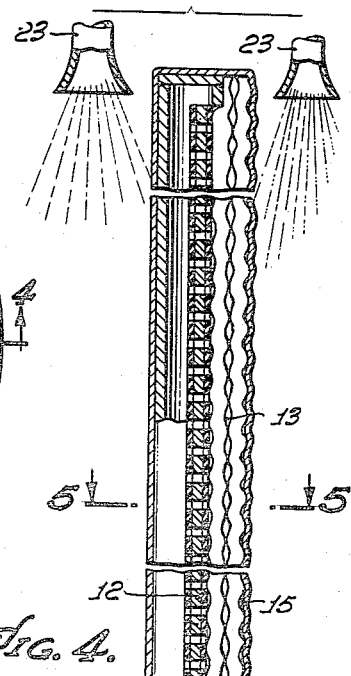
Fig. 4.
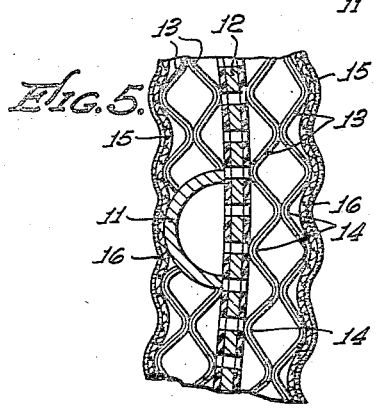
Fig. 5.
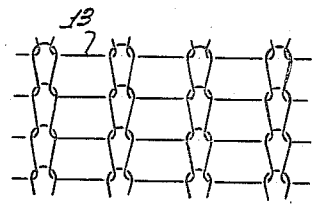
Fig. 7.
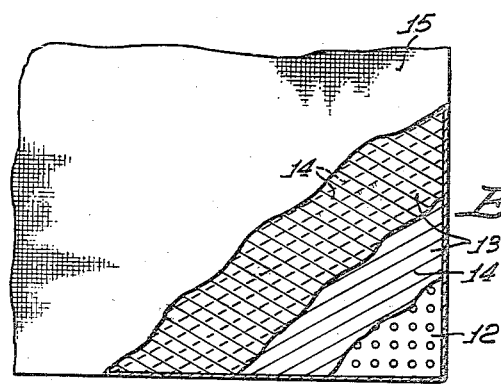
Fig. 6.
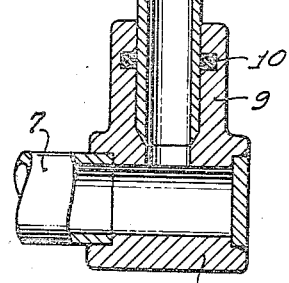
WILLIAM O. BAKER
INVENTOR.
BY *Lyon & Lyon*
ATTORNEYS.

_United States Patent Office_

2,854,142
Patented Sept. 30, 1958

2,854,142

FILTER

William O. Baker, West Covina, Calif., assignor to Swimquip Inc., El Monte, Calif., a corporation of California Application July 18, 1956, Serial No. 598,636

3 Claims. (Cl. 210—332)

This invention relates to filters, and included in the objects of the invention are:

First, to provide a filter which is particularly designed to handle large volumes of liquid in which is suspended a relatively small percentage of solids, as, for example, filters used in conjunction with swimming pools, and which incorporates a novel means for cleaning deposits from the surfaces of the filter.

Second, to provide a filter which is provided with a series of cylindrical filter cells arranged concentrically, each cell being independently supported by and readily removable from a common outlet manifold.

Third, to provide, in a filter having concentrically disposed filter cells, a series of self-rotating spray jets so disposed as to wash the surfaces of the filter cells simultaneously so that the cleaning cycle may be accomplished quickly and effectively.

Fourth, to provide a filter which, for a given filtering capacity, is particularly compact.

With the above and other objects in view, as may appear hereinafter, reference is directed to the accompanying drawings in which:

Fig. 3 is a transverse sectional view through 3—3 of Fig. 1;

Fig. 4 is an enlarged longitudinal sectional view of one of the filter cells, taken substantially through 4—4 of Fig. 3;

Fig. 5 is a still further enlarged fragmentary transverse setcional view, taken through 5—5 of Fig. 4;

Fig. 6 is a fragmentary substantially diagrammatical elevational view of one of the filter cells with successive layers broken away to show the internal construction;

Fig. 7 is an exaggerated view of the wire mesh found suitable as a means of supporting the filter membrane; and Fig. 8 is a fragmentary sectional view similar to Fig. 1, showing a modified form of the filter.

Figure 1:
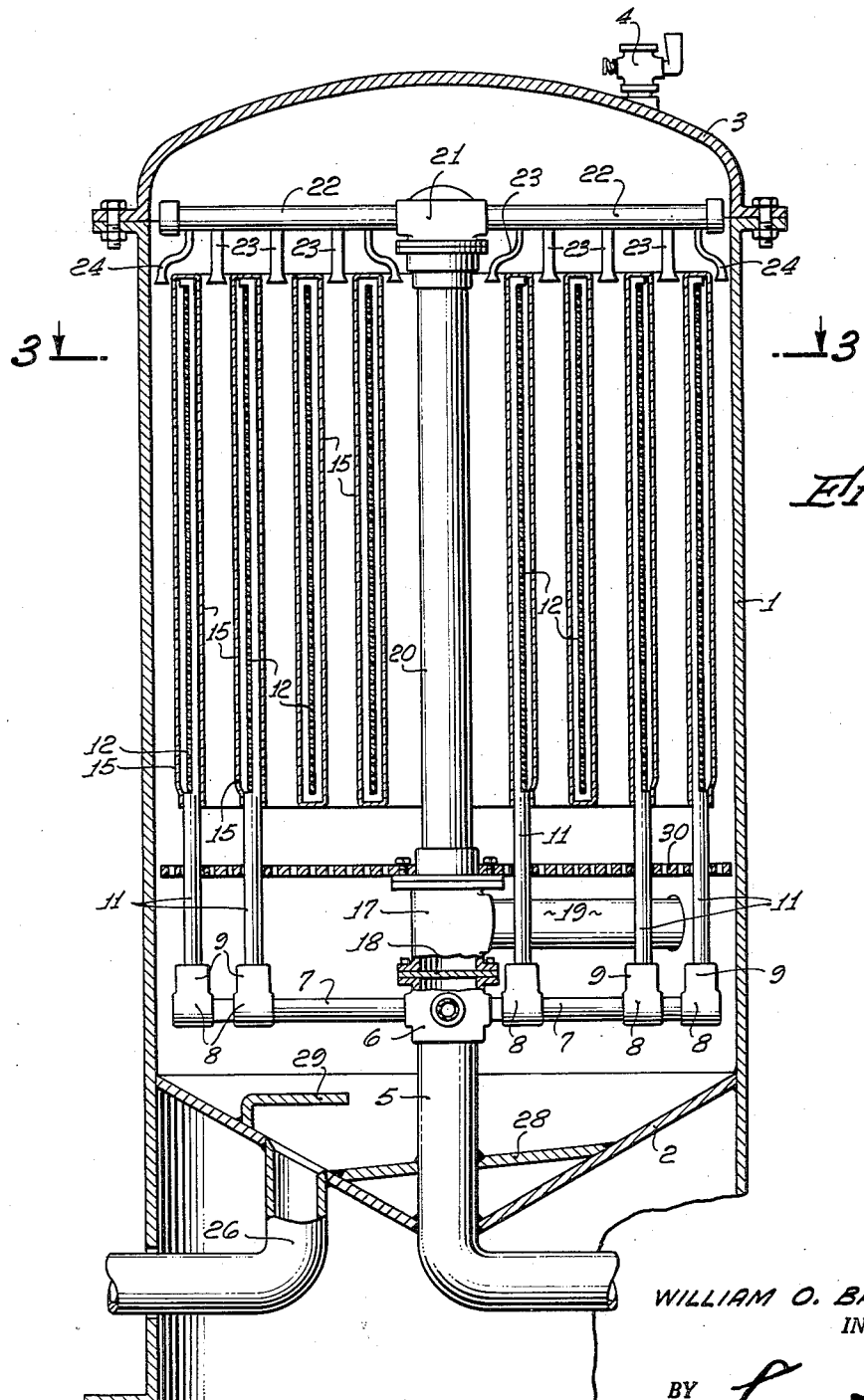
Figure 1 is a longitudinal sectional view of a filter incorporating the present invention.
Figure 2:
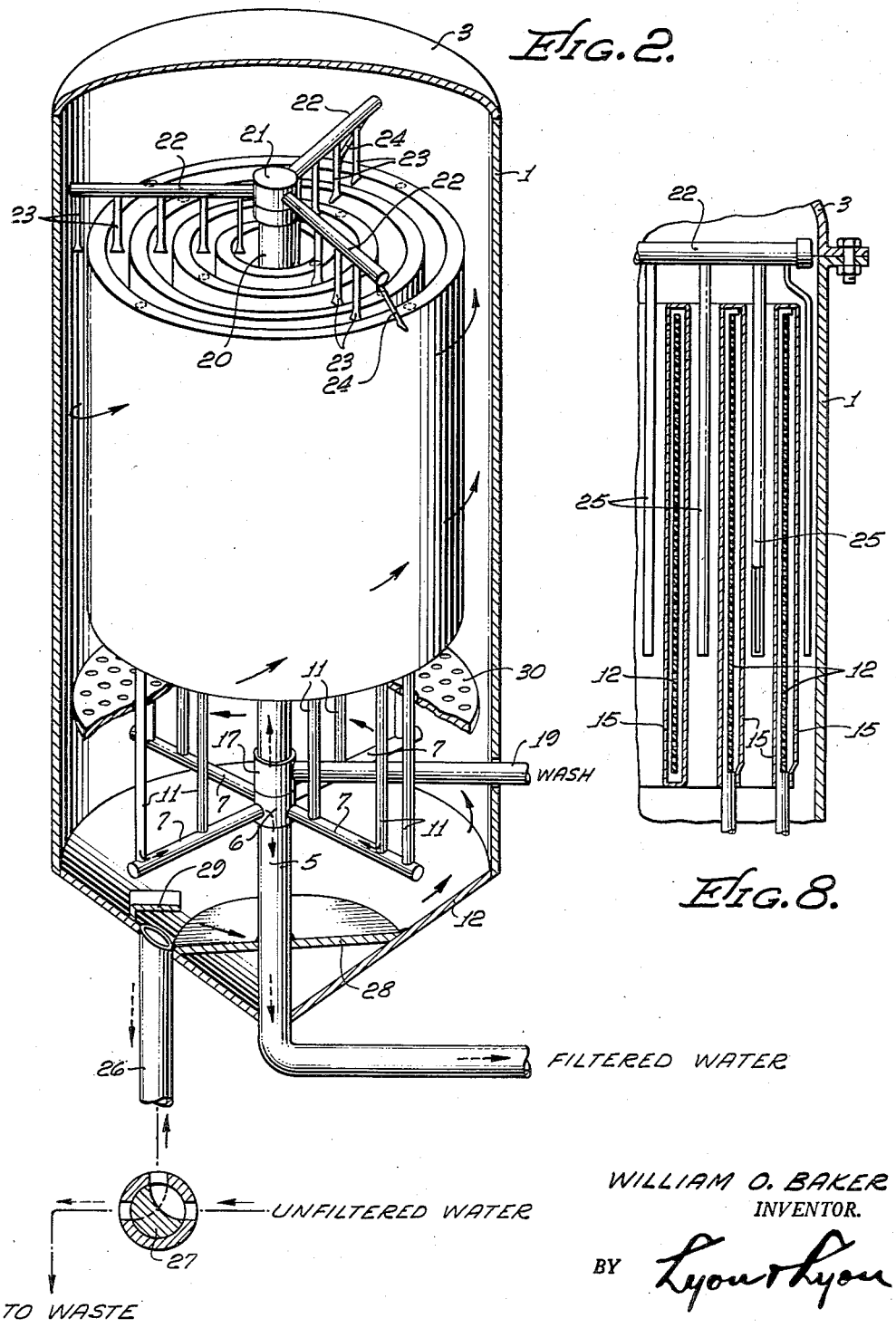
Fig. 2 is a substantially diagrammatical perspective view thereof with portions of the outer housing broken away.

The filter includes a cylindrical shell 1 which is closed at its lower end by a conical bottom member 2 and receives at its upper end a dome-shaped cover 3 secured thereto by bolts. The cover may be provided with an air vent valve 4.

Centrally supported in the bottom member 2 is a vertically disposed outlet pipe 5. The upper end of the outlet pipe is provided with a manifold fitting 6 having a series of radial openings in which are fitted radial or laterally directed pipes 7. The pipes are provided with T-fittings 8, each of which includes an upwardly directed sleeve 9 having a seal ring 10 therein. The T-fittings are adapted to receive and support vertically disposed discharge pipes 11.

The discharge pipes 11 support cylindrical core members 12 which are disposed in concentric relation with each other. A single discharge pipe may serve to support the smaller diametered core member, whereas two or more discharge pipes support the increasingly larger diametered core members.

Each discharge pipe 11 is cut longitudinally to form a semicylindrical portion. The corresponding core member 12 overlies the open side of the pipe so that the semicylindrical portion of the pipe and the overlying portion of the core member form a conduit communicating with the depending lower end of the pipe. Each core member is provided with a multiplicity of perforations.

Each cylindrical core member 12 is covered on its radially inner and radially outer sides with several layers of wire mesh forming foraminous pads 13. Each layer of wire mesh pads is preefrably woven in the manner shown in Fig. 7. In addition, each layer is corrugated in a bias direction, as indicated by 14 in Fig. 6. The corrugations of adjacent layers run in opposite directions so that the parts form virtually no resistence to flow; either transversely therethrough, or circumferentially or vertically. The wire comprising the pads may be bronze or other non-corrosive metal wire, or plastic wire or plastic-coated metal wire.

Each core member 12 and each wire mesh pad 13 is enclosed in an annular fabric envelope or membrane 15, preferably formed of woven fabric. Thus each cylindrical core with its pad and fabric membrane forms a filter unit having radially outer and radially inner filter surfaces through which fluid may flow to the annular space therebetween, and pass along and through the pads 13 and perforations in the core members to the discharge pipes 11.

The fabric bag or membrane 15 is supported principally by the crest of the corrugations 14 and bridge across these crests so that the percentage of "dead" area is reduced to a minimum; that is, the effective filtering area of a given filter cell approaches closely to its full internal and external area. Or stated otherwise, all portions of the fabric membrane are available for the filtering of fluid therethrough.

Each of the fabric membranes 15 is suitably secured around the respective discharge pipe 11. This may be done by tape wrappings or cement, or a combination of both means.

In practice, a filtering medium, such as diatomaceous earth, is entrained in the fluid to be filtered so that the surfaces of the filter membrane become coated with such filtering media, as indicated by 16 in Fig. 5.

The upper end of the manifold fitting 6 supports a T-fitting 17 but is separated therefrom by a partition 18. The lateral opening in the T-fitting 17 is connected to a wash supply pipe 19 extending radially through the shell 1. The T-fitting 17 in turn supports an upright or vertical wash pipe 20, the upper end of which receives a rotatable manifold head 21 having radial ports which are connected to radially extending pipes 22. The manifold head 21 and the pipes 22 are disposed above the filter units.

Each radial pipe 22 is provided with a series of depending spray nozzles 23 which are directed downwardly to points adjacent the upper extremities of the filter cells. Certain of the spray nozzles are canted or inclined, as indicated by 24, so that the reaction force, due to the discharge of a washing fluid, causes the spray nozzles to rotate about the annuli between the filter cells.

It has been found that unless the filter cells have excessive axial length, it is sufficient to terminate all of the spray nozzles adjacent the upper ends of the filter cells. However, if the axial length of the filter cells is increased beyond the capacity of the nozzles 23, extended spray nozzles 25 may be used, as shown in Fig. 8, so as to direct washing fluid at intermediate axial regions of the filter cells. The extended spray nozzles may merely be lengths of tubing with spray apertures adjacent their lower ends. The disposition and number of such extended spray nozzles depends upon the axial length and size of the filter cells.

The bottom member 2 is provided with an inlet pipe 26 located at one side of the outlet pipe 5. The inlet pipe is connected to a suitable three-way valve 27 adapted to be connected to a source of unfiltered water for flow into the filter, or arranged to discharge the contents of the filter to a waste or sump. In order to completely drain the filter, it is preferred to provide a false bottom 28 so as to dispose the inlet pipe 26 at the lowest point of the filter bottom.

To prevent channeling of the incoming fluid, there may be provided a baffle 29 over the inlet pipe 26. Furthermore, it is desirable to place a perforated plate 30 above the T-fitting 17 and below the filter cells. Such perforated plate serves to diffuse and distribute the fluid to be filtered and reduce the velocities to prevent turbulence or any washing of the filter membranes.

Operation of the filter is as follows:

Water is introduced into the filter through the inlet pipe 26 and air is bled through the valve 4. Diatomaceous earth, or analogous filter material, is introduced into the shell 1 directly or into the water entering through the inlet pipe 26. The use of such filtering material is of itself conventional.

In most filters utilizing a filtering material, such as diatomaceous earth, it is conventional to provide for a continual introduction of such filtering material. Such filtering material is retained on the surfaces of the filter membranes to build up a filter cake or coating 16. The unfiltered water passes through the filter coating 16, through the fabric membranes 15, and radially, as well as circumferentially and axially, through the wire mesh pads 13 and core member 12 to the various discharge pipes 11, lateral pipes 7, T-fitting 8, and outlet pipe 5. The perforated plate reduces the flow velocities around the filter membranes so that the filter cake is not washed off.

Periodically, the accumulations on the surfaces of the filter cells must be removed. This is accomplished by closing the outlet 5, turning the valve 27 so as to drain water from the filter, and then introducing wash water through the wash pipes 19 and 20, and then through the manifold 21, radial pipes 22, and spray nozzles 23, as well as the spray nozzles 25, if such be used.

Due to the canting of some of the nozzles, the nozzles rotate as their spray discharge washes downwardly on the radially inner and outer surfaces of the concentric filter cells so as to clean off all accumulations as well as the filter coating 16.

After the cleaning cycle is completed, the filter is reactivated by introducing appropriate quantities of filter material to build up a renewed coating 16.

It has been found that the washing cycle may be started even before the water has been drained from the filter, as the jets from the submerged spray nozzles are effective to clean the surfaces of the filter cells. It should be noted that to drain the filter, the air vent valve 4 is opened.

While particular embodiments of this invention have been shown and described, it is not intended to limit the same to the exact details of the constructions set forth, and it embraces such changes, modifications, and equivalents of the parts and their formation and arrangement as come within the purview of the appended claims.

What is claimed is:

1. A filter, comprising: a housing having an inlet and an outlet; an outlet manifold communicating with said outlet and having radiating arms; and a plurality of concentric filter cells having depending discharge tubes connected to and supported by said radiating arms, each filter cell including a perforated rigid core member supported by said depending discharge tubes, yieldable mesh pads covering said core member, and an annular fabric filter envelope enclosing said pads to form a hollow wall annular structure having yieldable radially inner and radially outer filter surfaces.

2. A filter, comprising: a housing having an inlet and an outlet; an outlet manifold communicating with said outlet and having radiating arms; a plurality of concentric filter cells having depending discharge tubes connected to and supported by said radiating arms, each filter cell including a rigid perforated core member supported by said depending discharge tubes, yieldable mesh pads covering said core member, and an annular yieldable fabric filter envelope enclosing said pads to form a yieldable hollow wall annular structure having radially inner and radially outer filter surfaces; a plurality of spray nozzles disposed so as to discharge a washing fluid against the filter surfaces of said filter cells; and means for rotatably supporting said nozzles for movement concentrically with said filter cells.

3. A filter, comprising: a housing; an outlet manifold having radiating arms and upwardly directed sleeves thereon; a plurality of concentric cylindrical filter cells, each including a perforated cylindrical rigid core, at least one discharge tube supporting said core and having a downwardly projecting stem adapted to be slidably received in a sleeve of said outlet manifold; each of said filter cells also including yieldable foraminous pad elements covering said core and yieldable filter membranes covering said pad elements, whereby liquid may penetrate said filter membranes from the radially inner and radially outer surfaces of said cell and discharge through said discharge tube; and means for introducing liquid to be filtered upwardly around and between said cells, at substantially turbulent-free velocities.

References Cited in the file of this patent
UNITED STATES PATENTS

| | | |
|---|---|---|
| 418,148 | Andre | Dec. 31, 1889 |
| 1,646,377 | Sweetland et al. | Oct. 18, 1927 |
| 1,882,546 | Brossman | Oct. 11, 1932 |
| 2,348,854 | Schreiber | May 16, 1944 |
| 2,705,221 | Clark et al. | Mar. 29, 1955 |